(12) United States Patent
Gareau et al.

(10) Patent No.: US 10,256,909 B2
(45) Date of Patent: Apr. 9, 2019

(54) SYSTEMS AND METHODS FOR RELATIVE PHASE MEASUREMENT AND ALIGNMENT OF 66B ENCODED SIGNALS

(71) Applicant: Ciena Corporation, Hanover, MD (US)

(72) Inventors: Sebastien Gareau, Ottawa (CA); Tim Norman, Ottawa (CA); Daniel Perras, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/690,639

(22) Filed: Aug. 30, 2017

(65) Prior Publication Data

US 2019/0068284 A1    Feb. 28, 2019

(51) Int. Cl.
| | | |
|---|---|---|
| H04J 3/06 | (2006.01) | |
| H04B 10/61 | (2013.01) | |
| H04J 14/02 | (2006.01) | |
| H04L 12/06 | (2006.01) | |
| H04L 1/00 | (2006.01) | |
| H04B 10/27 | (2013.01) | |
| H04L 7/00 | (2006.01) | |

(52) U.S. Cl.
CPC ........... *H04B 10/27* (2013.01); *H04L 7/0075* (2013.01)

(58) Field of Classification Search
CPC ............................. H04B 10/27; H04L 7/0075
USPC ...................................... 398/58, 54
See application file for complete search history.

(56) References Cited

U.S. PATENT DOCUMENTS

| | | | | |
|---|---|---|---|---|
| 5,526,156 A * | 6/1996 | Bostica | ............... | H04L 12/5601 370/395.5 |
| 5,757,869 A * | 5/1998 | Sands | ................... | H04J 3/0608 370/506 |
| 6,536,011 B1 * | 3/2003 | Jang | ................... | G11B 27/3027 369/47.28 |
| 6,760,346 B1 * | 7/2004 | Suemura | ................. | H04L 49/30 370/504 |
| 7,079,597 B1 * | 7/2006 | Shiraishi | ................. | H04L 7/042 370/509 |
| 7,443,922 B1 * | 10/2008 | Venkata | ................ | H04J 3/0605 375/295 |
| 8,107,499 B2 * | 1/2012 | Huang | .................. | H04L 5/1438 370/503 |
| 8,370,704 B2 * | 2/2013 | Ganga | .................. | H03M 5/145 714/757 |
| 9,236,952 B2 * | 1/2016 | Sun | ......................... | H04J 14/02 |

(Continued)

OTHER PUBLICATIONS

EEE 802.3, 2016.*
Hajduczenia,Marek PhD/ZTE Corporation64b/66b line code/pp. 1-23.

*Primary Examiner* — Oommen Jacob
(74) *Attorney, Agent, or Firm* — Clements Bernard Walker PLLC; Christopher L. Bernard; Lawrence A. Baratta, Jr.

(57) ABSTRACT

Systems and methods for the relative phase measurement and alignment of 66B encoded signals include receiving a plurality of 66B encoded signals each comprising sync headers which are periodically converted, determining a phase of each of the plurality of 66B encoded signals based on the periodically converted sync headers, and aligning the phase of each of the plurality of 66B encoded signals based on the determining. The periodically converted sync headers can include changing one of a first bit and a second bit of the sync header. A period of the periodically converted sync header can be set at twice a phase difference which is compensated at an egress point of the plurality of 66B encoded signals.

20 Claims, 4 Drawing Sheets

(56) References Cited

U.S. PATENT DOCUMENTS

| | | | |
|---|---|---|---|
| 9,432,144 B2 | 8/2016 | Gareau et al. | |
| 2001/0008001 A1* | 7/2001 | Suemura | H04L 25/03866 |
| | | | 710/316 |
| 2007/0092260 A1* | 4/2007 | Bontu | H04J 3/0608 |
| | | | 398/152 |
| 2007/0234172 A1* | 10/2007 | Chiabrera | H04L 1/0043 |
| | | | 714/752 |
| 2007/0263533 A1* | 11/2007 | Chiabrera | H04L 12/413 |
| | | | 370/229 |
| 2009/0172494 A1* | 7/2009 | Iima | H04L 1/24 |
| | | | 714/752 |
| 2009/0245428 A1* | 10/2009 | Yang | H04L 27/0014 |
| | | | 375/330 |
| 2009/0323878 A1* | 12/2009 | Konishi | H04L 7/042 |
| | | | 375/365 |
| 2010/0070822 A1* | 3/2010 | Leung | H04L 1/007 |
| | | | 714/752 |
| 2012/0327769 A1* | 12/2012 | Ghiasi | H04L 49/60 |
| | | | 370/235 |
| 2014/0044137 A1* | 2/2014 | Miyaji | H04L 25/14 |
| | | | 370/509 |
| 2014/0056370 A1* | 2/2014 | Chang | H04L 25/14 |
| | | | 375/259 |
| 2016/0134392 A1* | 5/2016 | Effenberger | H04L 1/0041 |
| | | | 714/776 |
| 2017/0005949 A1 | 1/2017 | Gareau et al. | |
| 2017/0093757 A1 | 3/2017 | Gareau et al. | |
| 2017/0237659 A1* | 8/2017 | Birrittella | H04L 45/745 |
| | | | 370/392 |

* cited by examiner

SYSTEMS AND METHODS FOR RELATIVE PHASE MEASUREMENT AND ALIGNMENT OF 66B ENCODED SIGNALS

FIELD OF THE DISCLOSURE

The present disclosure generally relates to signal mapping in networking applications. More particularly, the present disclosure relates to systems and methods for the relative phase measurement and alignment of 66B encoded signals such as Ethernet, Fibre Channel, Common Public Radio Interface (CPRI), and the like being mapped into another protocol such as Optical Transport Network (OTN) and the like.

BACKGROUND OF THE DISCLOSURE

64B/66B is a line code that transforms 64-bit data to 66-bit line code to provide enough state changes to allow reasonable clock recovery and facilitate alignment of a data stream at a receiver. The overhead of 64B/66B encoding (also referred to herein as 66B encoding) is 2 overhead bits for every 64 raw bits transmitted or 3.125%. This is considerably more efficient than the 25% overhead of the previously used in the 8B/10B encoding scheme which essentially charges every 8 bits of source data with a 2 bit (or 25%) overhead. Various protocols use 66B encoding such as, without limitation, Ethernet, Fibre Channel, InfiniBand, CPRI, etc. There are various applications in these protocols that require the relative phase relationship between different signals to be maintained across a transport network. An example application where the relative phase relationship must be maintained is in the financial industry where network services (e.g., Ethernet) are provided to high-frequency traders to connect to a stock exchange. To ensure fairness, the latency of each network service sold must be the same. Another example in Fibre Channel is trunking of Interswitch links (ISL) which requires the propagation delay of each ISL member be the same in order for the trunks to form. Various other examples are possible including Service Layer Agreements (SLAs) and the like.

66B encoded signals can be carried over another transport network protocol. An example such a transport network protocol is OTN, but other protocols are also contemplated (e.g., SONET, SDH, FlexE, etc.). The transport network protocol can introduce phase variations between signals. For example, OTN can be used to transport multiple 10 Gigabit Ethernet (10 GbE) signals on the same optical tributary signal between end user locations. However, OTN does not provide the ability to maintain the relative phase (and therefore latency or propagation delay) between OPUk payloads. On the contrary, an OTN mapper (circuitry) introduces delay skew between the OPUk payloads because of the delay uncertainty of its elastic stores. For conventional OTN equipment to support time/phase sensitive applications, the depth of the elastic stores must be tightly controlled.

However, controlling the depth of elastic stores in an OTN network is a complex task. First, due to the gaps in the data stream for the OTN overhead, the fill level of the elastic store is a noisy metric. This makes it difficult to produce a meaningful comparison between fill levels from different elastic stores. Second, when multiple stages of OTN mapping are used, there may be multiple inline elastic stores in the data path, each of which needs to be controlled. Third, if the mapped client signals take different paths through the OTN network, they may experience different delays that cannot be compensated by controlling the delay through the elastic stores alone.

BRIEF SUMMARY OF THE DISCLOSURE

Due to the complexity of measuring and aligning phase at the transport (container) layer, there is a need to provide a technique for relative phase measurement and alignment of 66B encoded signals at the client layer, i.e., natively in the 66B encoded signals.

In an embodiment, a method for relative phase measurement and alignment of 66B encoded signals includes receiving a plurality of 66B encoded signals each including sync headers which are periodically converted; determining a phase of each of the plurality of 66B encoded signals based on the periodically converted sync headers; and aligning the phase of each of the plurality of 66B encoded signals based on the determining. The periodically converted sync headers can include changing one of a first bit and a second bit of the sync header. A period of the periodically converted sync header can be set at twice a phase difference which is compensated at an egress point of the plurality of 66B encoded signals. The receiving can be from a transport network and wherein the periodically converted sync headers can be converted concurrently at an ingress point of the transport network and the determining can provide a relative phase measurement between the plurality of 66B encoded signals based on delay in the transport network. The transport network can utilize Optical Transport Network (OTN). The plurality of 66B encoded signals can include any of Ethernet, Fibre Channel, Common Public Radio Interface (CPRI), and InfiniBand which require a relative phase relationship between multiple signals to be maintained over a transport network. The method can further include reconverting the periodically converted sync headers. The determining can include locking to a pattern of the periodically converted sync headers; and providing a frame pulse indicating when each periodically converted sync header occurs. The aligning can include programming one or more delay elements for the plurality of 66B encoded signals based on relative phase differences therebetween.

In another embodiment, an apparatus configured for relative phase measurement and alignment of 66B encoded signals includes circuitry configured to receive a plurality of 66B encoded signals each including sync headers which are periodically converted; circuitry configured to determine a phase of each of the plurality of 66B encoded signals based on the periodically converted sync headers; and circuitry configured to align the phase of each of the plurality of 66B encoded signals based on the determined phase of each of the plurality of 66B encoded signals. The periodically converted sync headers can include changing one of a first bit and a second bit of the sync header. A period of the periodically converted sync header can be set at twice a phase difference which is compensated at an egress point of the plurality of 66B encoded signals. The received plurality of 66B encoded signals can be from a transport network and wherein the periodically converted sync headers can be converted concurrently at an ingress point of the transport network and the circuitry configured to determine can provide a relative phase measurement between the plurality of 66B encoded signals based on delay in the transport network. The transport network can utilize Optical Transport Network (OTN). The plurality of 66B encoded signals can include any of Ethernet, Fibre Channel, Common Public Radio Interface (CPRI), and InfiniBand which require a relative phase relationship between multiple signals to be maintained over a transport network. The apparatus can further include circuitry configured to reconvert the periodically converted sync headers. The circuitry configured to determine can be configured to lock to a pattern of the periodically converted sync headers, and provide a frame pulse indicating when each periodically converted sync header occurs. The circuitry configured to align can be configured to program one or more delay elements for the plurality of 66B encoded signals based on relative phase differences therebetween.

In a further embodiment, an Optical Transport Network (OTN) mapper/demapper for relative phase measurement and alignment of 66B encoded signals includes sync header conversion process circuitry configured to receive a plurality of 66B encoded signals; a controller configured to periodically direct the sync header conversion process to concurrently convert sync headers for the plurality of 66B encoded signals; sync header conversion lock process circuitry configured to measure a phase of each of the plurality of 66B encoded signals based on the converted sync headers; delay elements configured to delay the plurality of 66B encoded signals based on the measured phase; and OTN mapping and framing circuitry configured to map/demap and frame/deframe the plurality of 66B encoded signals. The periodically converted sync headers can include changing one of a first bit and a second bit of the sync header.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods for the relative phase measurement and alignment of 66B encoded signals such as Ethernet, Fibre Channel, Common Public Radio Interface (CPRI), and the like being mapped into another protocol such as Optical Transport Network (OTN) and the like. Again, when 66B encoded signals are mapped to OTN (or other transport network protocols, e.g., Layer 1), their relative phase relationship is not maintained. The OTN mapping processes operate independent of each other, and therefore the phase of the signals that are transported are not controlled. The systems and methods described herein measure and control the phase (skew) of independent signals carried over a common transport network. That is, the measurement and alignment are performed at the 66B encoded signal layer independent of the transport/server layer (e.g., OTN). As described herein, 66B encoded signals can be adapted to be carried across some transport layer (i.e., OTN, SONET, etc.)

By measuring and aligning at the client layer, the systems and methods are less complex than transport/server layer approaches because only a single delay element is required at the output of the transport network which is operated based on a measurement based on the 66B encoded signal. In principle, any delay between two client data streams could be compensated (limited by the size of the delay element and the period of the Sync header conversions), even when the client data streams take different paths through the transport network. Additionally, because the alignment is performed at the 66B client layer, it is easily adaptable to transport/server layers other than OTN (e.g., SONET, SDH, FlexE, etc.).

Figure 1:
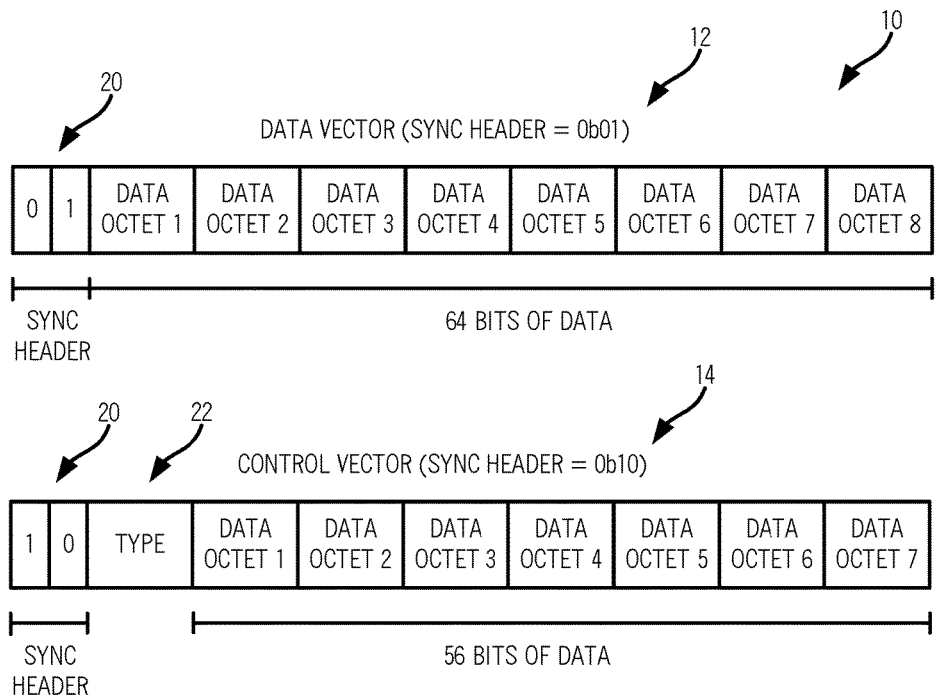
FIG. 1 is a block diagram of 66B encoded signals, namely a data vector and a control vector.

FIG. 1 is a block diagram of 66B encoded signals 10, namely a data vector 12 and a control vector 14. The 66B encoded signals 10 are formed through a 64B/66B encoding process in which 64 bits of data are transmitted as a 66-bit entity. The 66-bit entity is made by prefixing one of two possible two-bit preambles to the 64 bits to be transmitted. The two-bit preamble is referred to as a synchronization (sync) header 20. If the sync header 20 is 01, the 64 bits following the sync header 20 are entirely data as in the data vector 12. If the sync header 20 is 10, the 64 bits following the sync header 20 include an eight-bit type field 22 followed by 56 bits of control information and/or data as in the control vector 14. The type field 22 indicates the type of the control vector 14 and its corresponding internal structure. Conventionally, values of 00 or 11 are not used for the sync header 20 and generate an error if seen. With the sync header 20 values of 01 or 10, a bit transition is guaranteed every 66 bits which means that a continuous stream of 0s or 1s larger than 66 bits cannot be valid data.

The complete payload (either the data vector 12 or the control vector 14) is then scrambled using a self-synchronous scrambler function, with the intention of ensuring that a relatively even distribution of 1s and 0s are normally found in the transmitted data. The intention is not to encrypt the data, but to give the transmitted data useful engineering properties. The scrambler does not provide an absolute guarantee that output data will never have a long run-length of 0s or all 1s or other undesirable properties but instead allows strong statistical bounds to be put on the probability of such events. Practical designs will choose system parameters such that a bit-error due to long run-lengths is vanishingly unlikely. This approach is different from the codebook based approach of 8B/10B encoding.

Figure 2:
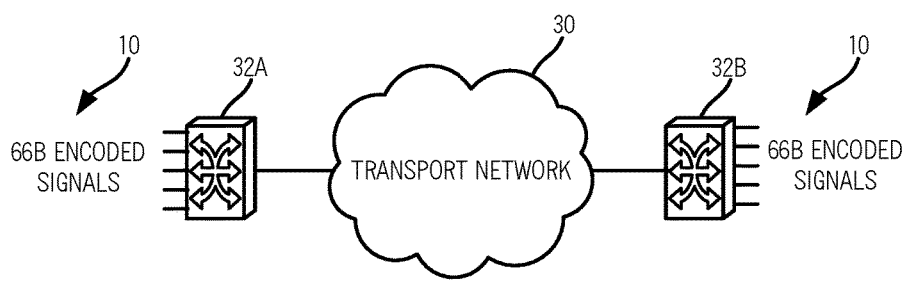
FIG. 2 is a network diagram of a transport network with two network elements supporting 66B encoded signals transported over the transport network.

Conventionally, there is no technique to convey phase information in the 66B encoded signals without affecting the intent or rate of the client signal. FIG. 2 is representative of a network diagram of a transport network 30 with two network elements 32A, 32B supporting 66B encoded signals 10 transported over the transport network 30. The transport network 30 can include various nodes, network elements, etc. which are omitted for illustration purposes. That is, the transport network 30 is illustrated as a cloud, and those skilled in the art will recognize there can be various elements forming connectivity between the network elements 32A, 32B including over diverse paths. The transport network 30 can include Dense Wavelength Division Multiplexing (DWDM), OTN, SONET, SDH, FlexE, etc. That is, the transport network 30 can include any (Layer 1) protocol used to transport the 66B encoded signals 10. The network elements 32A, 32B can include ports, circuitry, optics, etc. which support ingress/egress of the 66B encoded signals 10 for transmission over the transport network 30. Of note, the transport network 30 can use various techniques for transmission, and there are no requirements for individual 66B encoded signals to take the same route through the transport network 30, such as due to protection, control plane routing, etc.

Again, the systems and methods described herein provide a technique for measuring the relative phase between the 66B encoded signals 10 when the 66B encoded signals 10 are carried across the transport network 30. The systems and methods further include a technique for aligning the relative phase between the 66B encoded signals 10 at an egress point, i.e., depending on the transport direction the network elements 32A, 32B, of the transport network 30. Advantageously, the systems and methods operate at the 66B layer independent of any protocols in the transport network 30 as well as independent of any routes the 66B encoded signals 10 have in the transport network 30. Accordingly, the latency of the 66B encoded signals 10 can be maintained regardless of actions in the transport network 30, i.e., protection switches, path changes, delay in OTN, etc.

Figure 3:
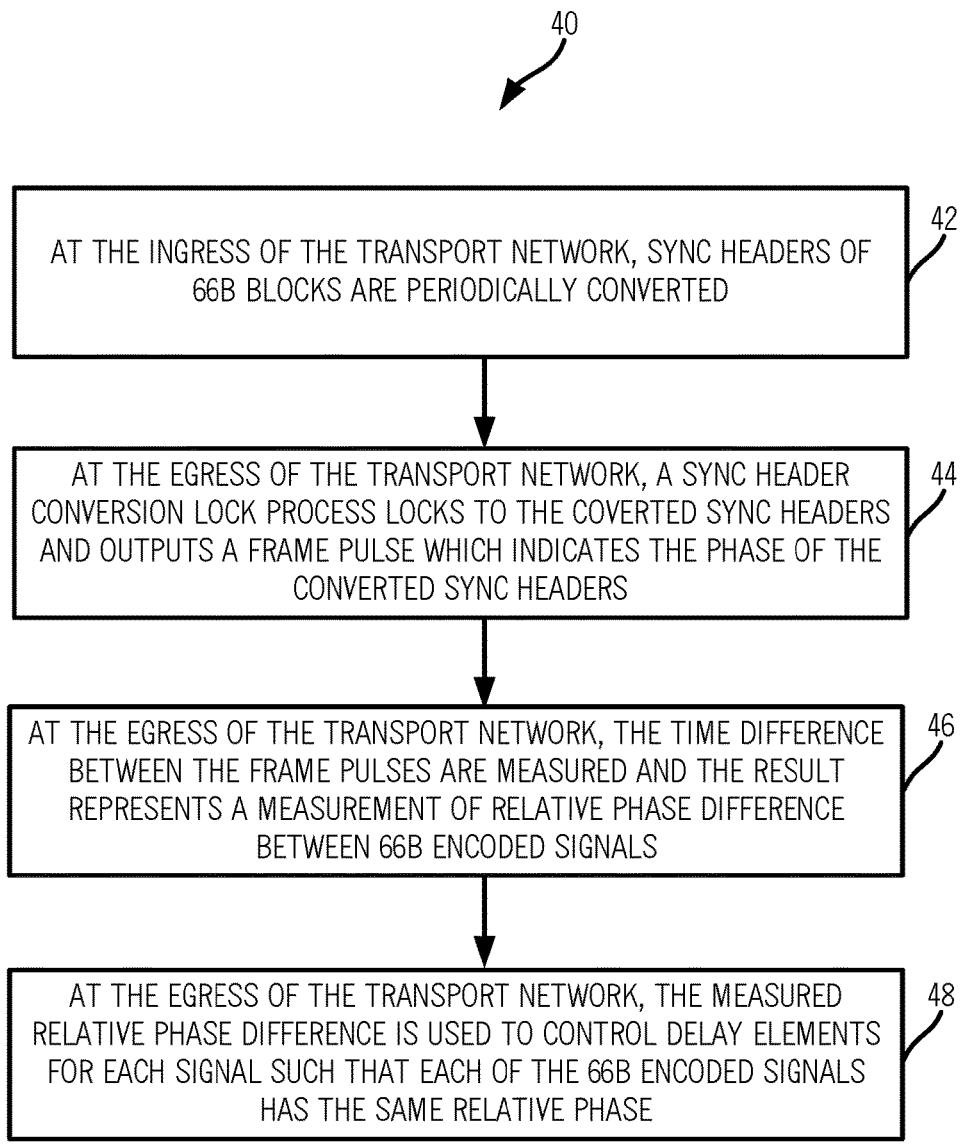
FIG. 3 is a flowchart of a process for measuring and aligning the relative phase between 66B encoded signals transported in the transport network of FIG. 2 in accordance with the proposed solution.

FIG. 3 is a flowchart of a process 40 for measuring and aligning the relative phase between 66B encoded signals 10 transported in the transport network 30. The process 40 uses the fact the sync headers 20 are periodic, i.e., every 64 bits, to convey phase information. The process 40 is implemented by the network elements 32A, 32B at the ingress and egress points for the transport network 30. Also, the process 40 operates at the 66B layer (client layer) independent of any server protocol or path in the transport network 30. The process 40 has two aspects—a phase measurement at the 66B layer and a phase alignment of the relative phase of a plurality of 66B encoded signals. For illustration purposes, the process 40 is described with the network element 32A as the ingress point and the network element 32B as the egress point of the transport network 30. Those skilled in the art will recognize each of these network elements 32A, 32B can perform both ingress and egress for bi-directional communication of the 66B encoded signals 10.

The phase measurement at the 66B layer utilizes a conversion of the sync headers 20 periodically at the ingress of the transport network 30, i.e., at the network element 32A (step 42). Specifically, the sync headers 20 are only two values—01 for the data vector 12 and 10 for the control vector 14. The process 40 creates a so-called converted sync header 20 which has one of the other possible values—00 or 11 to relay phase to the egress point. Specifically, the process 40 operates on multiple 66B encoded signals 10 at the ingress point. Step 42 is performed on each of the multiple 66B encoded signals 10 at the same time. Thus, any difference in relative phase of the converted sync headers 20 at the egress point can be measured.

Conventionally, the other possible values—00 or 11—denote an error condition. However, the process 40 is implemented by the network elements 32A, 32B such that these elements expect converted sync headers 20 at a certain period. The network elements 32A, 32B can convert these converted sync headers 20 back to their expected values—10 or 01. At the egress of the transport network, a Sync Header Conversion (SHC) lock process locks to the converted sync headers 20 (step 44). This lock process can output a "frame pulse" which indicates the phase of the converted sync headers 20. Also, at the egress of the transport network, the time difference between the frame pulses that are output from the SHC lock processes are measured (step 46). The result is a measurement of the relative phase difference between 66B encoded signals. Specifically, each encoded 66B signal 10 will have an associated phase based on its pulses (i.e., converted sync headers 20). The relative phase difference is the difference in the phase between multiple encoded 66B signals 10.

Note, the converted sync headers 20 do not need to be converted on every 66B frame, but at some reasonable period to convey the phase information. For example, the period can be 8 kHz, 1.544 MHz, 2.048 MHz, 19.44 MHz or any other value as required for phase alignment resolution. Thus, the converted sync headers 20 are changed at a low rate ensuring the value of 64B/66B encoding is maintained (which ensures a bit transition at least every 64 bits). In an embodiment, the period of the conversions can be twice the phase difference that is to be compensated for at egress. That is, the resolution of the alignment should be used to set the period.

With each 66B encoded signal 10 having a measured phase, at the egress of the transport network 10, the measured relative phase difference is used to control delay elements for each 66B encoded signal 10 such that each of the 66B encoded signals 10 has the same relative phase (step 48). For example, given N 66B encoded signals 10, one of the N can be selected such as with the highest phase delay, and the remaining N 66B encoded signals 10 can be delayed such that each of the N 66B encoded signals 10 have the same phase as that of the selected most delayed 66B encoded signal (or such that their relative phase difference is zero). In this manner, at the client layer, multiple 66B encoded signals can be guaranteed to have least (no or minimal) latency with respect to one another.

Figure 4:
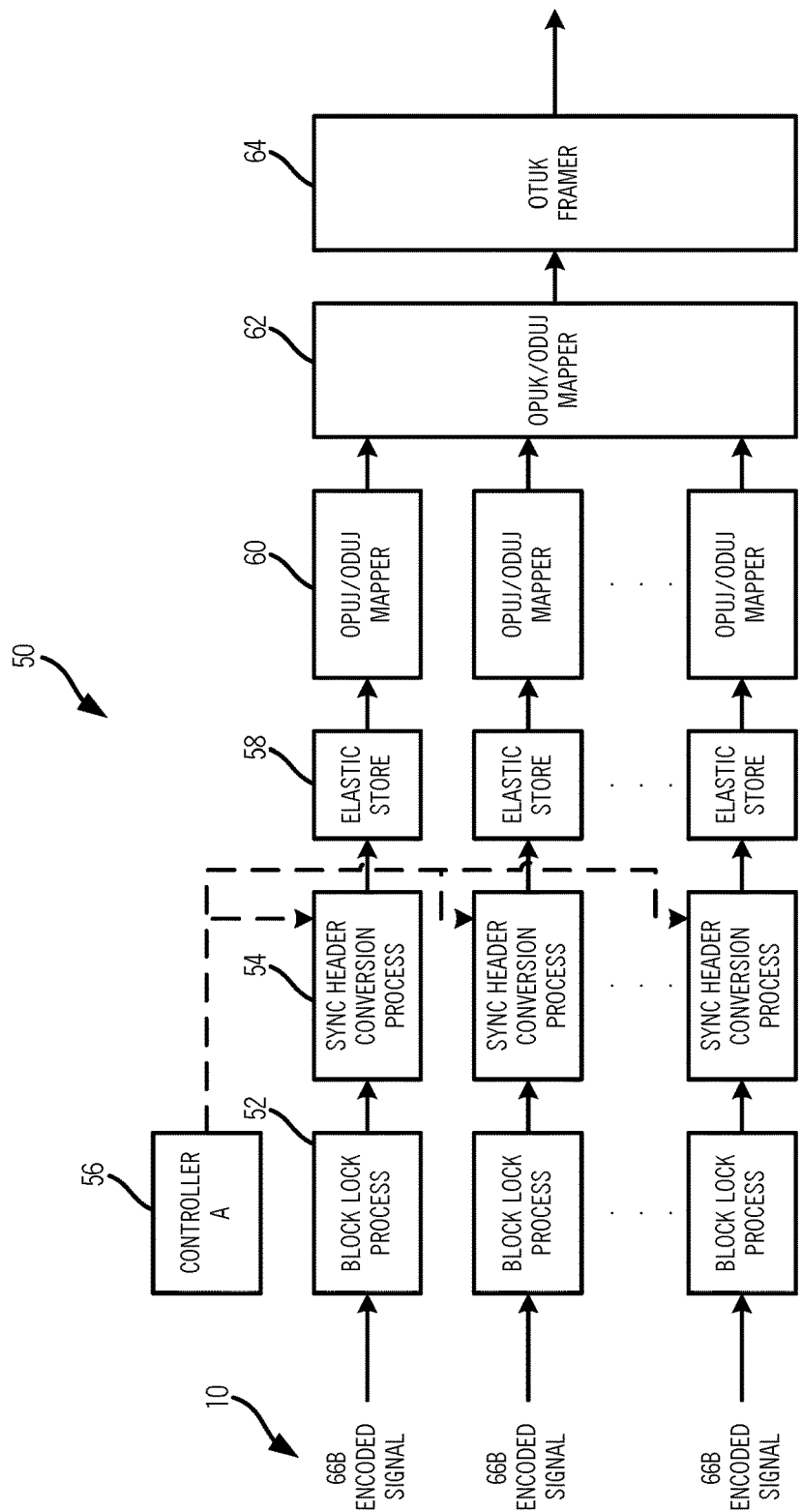
FIG. 4 is a block diagram of an OTN mapper configured to implement the actions at the ingress of the transport network, such as in the network elements in accordance with the proposed solution.

FIG. 4 is a block diagram of an OTN mapper 50 configured to implement the actions at the ingress of the transport network 30, such as in the network elements 30, 32. Again, the description herein assumes OTN for the transport network and server layer 30, although other protocols are also contemplated. The OTN mapper 50 is circuitry which receives multiple 66B encoded signals 10. Note, the multiple 66B encoded signals 10 are related in some manner, and it is desired to ensure no (or minimal) relative phase difference between these signals. The OTN mapper 50 is configured to time stamp each of these multiple 66B encoded signals 10 at the same time. Specifically, the OTN mapper 50 is configured to perform step 42 while mapping the multiple 66B encoded signals 10 into OTN.

The multiple 66B encoded signals 10 are each received at a block lock process 52 which outputs to an ingress SHC process 54. A controller 56 periodically sends a signal to the ingress SHC processes 54 instructing them to convert the sync header 20 of the next 66B block in the data stream. Again, the controller 56 instructs all of the ingress SHC processes 54 simultaneously such that the initial timestamp is identical for all of the multiple 66B encoded signals 10. The ingress SHC process 54 can work by inverting the second bit of the sync header 20. Thus, a sync header 20 of 01b is changed to 00b and a sync header 20 of 10b is changed to 11b. Note, the ingress SHC processes 54 could instead invert the first bit of the sync header 20—a sync header 20 of 01b is changed to 11b and a sync header 20 of 10b is changed to 00b.

The period of the conversions can be twice the phase difference that is to be compensated for at egress. Because the data rate is unchanged by this process, standard mappings can be used to map the signals into OTN. The ingress SHC process 54 performs the conversion periodically, and all 66B blocks are provided to an elastic store 58 including converted and non-converted blocks. The 66B blocks are provided to mappers 60, 62 and a framer 64 for an Optical Path Unit level j (OPUj) to Optical Data Unit level j (ODUj) mapping, an OPU level k (OPUk) to ODUj mapping, and for Optical Transport Unit level k (OTUk) framing. The output of the OTN mapper 50 is an OTUk signal with the multiple 66B encoded signals 10 having select sync headers 20 converted to denote sync for phase measurement at the egress.

Figure 5:
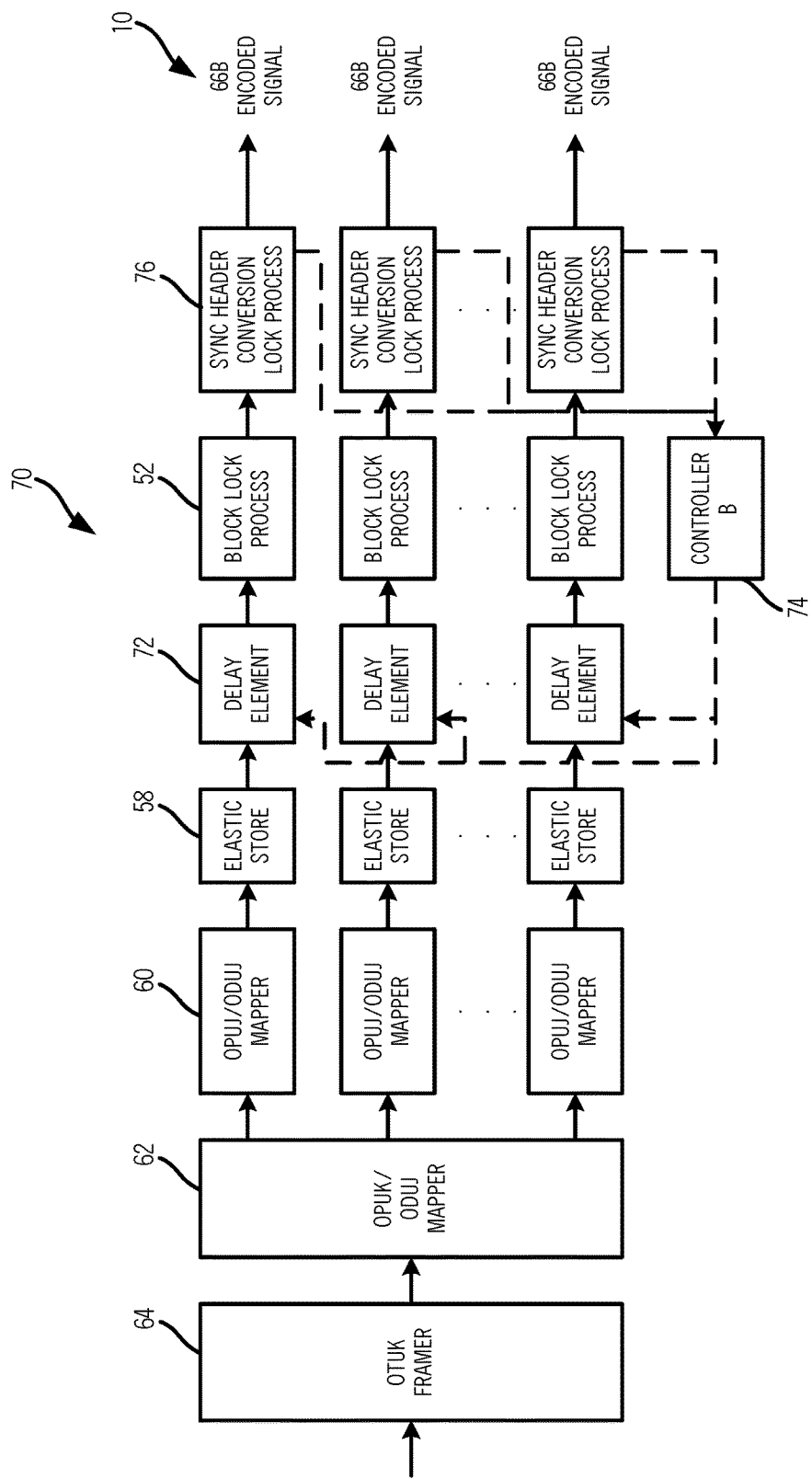
FIG. 5 is a block diagram of an OTN demapper configured to implement the actions at the egress of the transport network, such as in the network elements in accordance with the proposed solution.

FIG. 5 is a block diagram of an OTN demapper 70 configured to implement actions at the egress of the transport network 30, such as in the network elements 30, 32. The OTN demapper 70 is circuitry which receives OTUk frames and outputs the multiple 66B encoded signals 10, i.e., the counter to the OTN mapper 50. Again, the multiple 66B encoded signals 10 are related in some manner, and it is desired to ensure no (or minimal) relative phase difference between these signals. The OTN demapper 70 is configured to measure the phase of each of the multiple 66B encoded signals 10 and introduce delay if required such that each of these signals has the same relative phase when output by OTN demapper 70. Specifically, the OTN demapper 70 is configured to perform steps 44, 46, 48. The OTN demapper 70 can be incorporated in the same circuitry as the OTN mapper 50 operating on data streams conveyed in the opposite direction.

The OTN demapper 70 can include a reverse process from the OTN mapper 50—OTUk signals are received by the framer and provided to the mappers 60, 62 (specifically to perform de-framing and de-mapping). The 66B encoded blocks are put into the elastic store 58 which connect to delay elements 72 which can adjust the relative phase of the multiple 66B encoded signals 10. The delay elements 72 connect to the block lock processes 52 which connect to the egress SHC lock processes 76 from which the multiple 66B encoded signals 10 are output.

The egress SHC lock processes 76 lock to the pattern of the converted sync headers 20. Each egress SHC lock process 76 can use the same process (as defined in IEEE 802.3) that is used to achieve 66B block lock. However, instead of locking to sync headers 20 with values of 01b and 10b, the egress SHC lock process 76 locks to sync headers 20 values of 00b and 11b. Once the lock is achieved, a "frame pulse" is output from the process 76 to a controller 74 indicating when the converted sync header 20 occurred for each 66B encoded block received.

Also, the egress SHC lock process 76 can restore the original sync header 20 value, e.g., from 00b to 01b or 10b and from 11b to 10b or 01b. The controller 74 measures the relative phase between the frame pulses, thus measuring the relative phase between the multiple 66B encoded signals 10. The controller 74 then programs the delay elements 72 so that the relative skew becomes zero. In doing so, phase alignment of the output 66B encoded signals 10 is achieved. Thus, there is a feedback loop between the egress SHC lock processes 76 and the delay element 72 such that the multiple 66B encoded signals 10 are phase aligned. For example, the 66B block which corresponds to the last received frame pulse is set to zero delay and the other 66B block delays are set to correspond to time differences from the last received frame pulse.

It will be appreciated that some embodiments described herein may include one or more generic or specialized processors ("one or more processors") such as microprocessors; Central Processing Units (CPUs); Digital Signal Processors (DSPs); customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for relative phase measurement and alignment of 66B encoded signals implemented at a receiver, the method comprising:

receiving a plurality of 66B encoded signals each comprising sync headers which are periodically converted, wherein the periodically converted sync headers comprise changing one of a first bit and a second bit of the sync header;

determining a phase of each of the plurality of 66B encoded signals based on the periodically converted sync headers; and aligning the phase of each of the plurality of 66B encoded signals based on the determining.

2. The method of claim 1, wherein a period of the periodically converted sync header is set at twice a phase difference which is compensated at an egress point of the plurality of 66B encoded signals.

3. The method of claim 1, wherein the receiving is from a transport network and wherein the periodically converted sync headers are converted concurrently at an ingress point of the transport network and the determining provides a relative phase measurement between the plurality of 66B encoded signals based on delay in the transport network.

4. The method of claim 3, wherein the transport network utilizes Optical Transport Network (OTN).

5. The method of claim 1, wherein the plurality of 66B encoded signals comprise any of Ethernet, Fibre Channel, Common Public Radio Interface (CPRI), and InfiniBand which require a relative phase relationship between multiple signals to be maintained over a transport network.

6. The method of claim 1, further comprising:
reconverting the periodically converted sync headers.

7. The method of claim 1, wherein the determining comprises:
locking to a pattern of the periodically converted sync headers; and
providing a frame pulse indicating when each periodically converted sync header occurs.

8. The method of claim 1, wherein the aligning comprises:
programming one or more delay elements for the plurality of 66B encoded signals based on relative phase differences therebetween.

9. An apparatus, at a receiver, configured for relative phase measurement and alignment of 66B encoded signals, the apparatus comprising:
circuitry configured to receive a plurality of 66B encoded signals each comprising sync headers which are periodically converted;
circuitry configured to determine a phase of each of the plurality of 66B encoded signals based on the periodically converted sync headers, wherein the periodically converted sync headers comprise changing one of a first bit and a second bit of the sync header; and
circuitry configured to align the phase of each of the plurality of 66B encoded signals based on the determined phase of each of the plurality of 66B encoded signals.

10. The apparatus of claim 9, wherein a period of the periodically converted sync header is set at twice a phase difference which is compensated at an egress point of the plurality of 66B encoded signals.

11. The apparatus of claim 9, wherein the received plurality of 66B encoded signals are from a transport network and wherein the periodically converted sync headers are converted concurrently at an ingress point of the transport network and the circuitry configured to determine provides a relative phase measurement between the plurality of 66B encoded signals based on delay in the transport network.

12. The apparatus of claim 11, wherein the transport network utilizes Optical Transport Network (OTN).

13. The apparatus of claim 9, wherein the plurality of 66B encoded signals comprise any of Ethernet, Fibre Channel, Common Public Radio Interface (CPRI), and InfiniBand which require a relative phase relationship between multiple signals to be maintained over a transport network.

14. The apparatus of claim 9, further comprising:
circuitry configured to reconvert the periodically converted sync headers.

15. The apparatus of claim 9, wherein the circuitry configured to determine is configured to
lock to a pattern of the periodically converted sync headers, and
provide a frame pulse indicating when each periodically converted sync header occurs.

16. The apparatus of claim 9, wherein the circuitry configured to align is configured to
program one or more delay elements for the plurality of 66B encoded signals based on relative phase differences therebetween.

17. An Optical Transport Network (OTN) mapper/demapper for relative phase measurement and alignment of 66B encoded signals, the OTN mapper/demapper comprising:
sync header conversion process circuitry configured to receive a plurality of 66B encoded signals;
a controller configured to periodically direct the sync header conversion process to concurrently convert sync headers for the plurality of 66B encoded signals, wherein the periodically converted sync headers comprise changing one of a first bit and a second bit of the sync header;
sync header conversion lock process circuitry configured to measure a phase of each of the plurality of 66B encoded signals received based on the converted sync headers;
delay elements configured to delay the plurality of 66B encoded signals based on the measured phase; and
OTN mapping and framing circuitry configured to map/demap and frame/deframe the plurality of 66B encoded signals.

18. The OTN mapper/demapper of claim 17, wherein a period of the periodically converted sync header is set at twice a phase difference which is compensated at an egress point of the plurality of 66B encoded signals.

19. The OTN mapper/demapper of claim 17, wherein the sync header conversion process circuitry is configured to reconvert the periodically converted sync headers.

20. The OTN mapper/demapper of claim 17, wherein the sync header conversion lock process circuitry is configured to lock to a pattern of the periodically converted sync headers and provide a frame pulse indicating when each periodically converted sync header occurs.

* * * * *